March 8, 1927.
W. J. KIDD
1,620,467
LOW SPEED PEDAL ACTUATING AND HOLDING MEANS
Filed Dec. 23, 1925
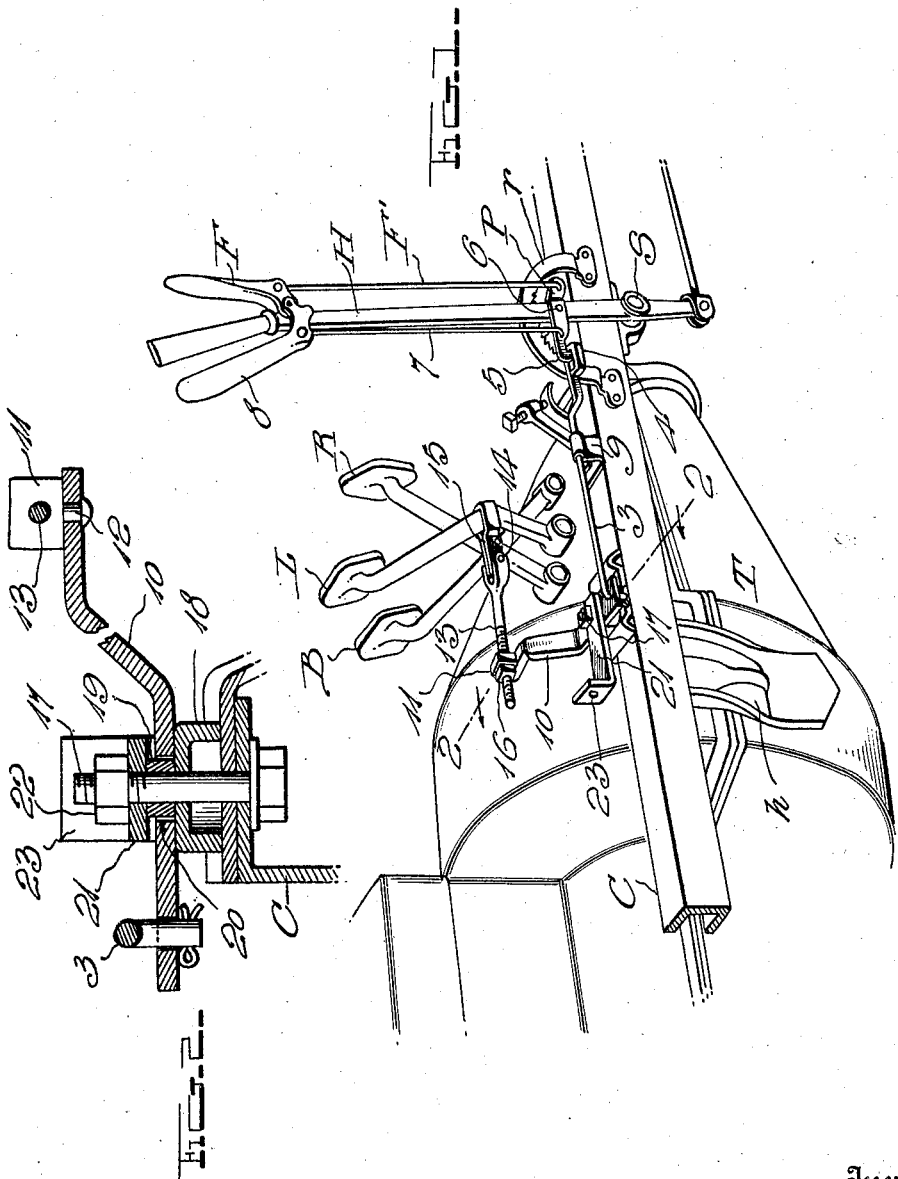
Witness
H. Woodard
Inventor
William J. Kidd
By H. B. Willson & Co.
Attorneys Patented Mar. 8, 1927.

1,620,467

UNITED STATES PATENT OFFICE.

WILLIAM J. KIDD, OF WALNUTPORT, PENNSYLVANIA.

LOW-SPEED-PEDAL ACTUATING AND HOLDING MEANS.

Application filed December 23, 1926. Serial No. 156,640.

The invention aims to provide a new and improved, easily attached and easily operated actuating and holding means for the low speed pedal of a well known form of automobile, said actuating and holding means being brought into play by rearward movement of the usual hand lever, which lever is employed for the two-fold purpose of moving the low speed pedal to neutral position and applying the usual hub brakes. The movement which this lever has prior to applying the brakes, is utilized to operate my improvement and by such improvement, the car may be held in low gear for any desired length of time, without strain upon the driver, the invention being particularly desirable when climbing long steep grades.

With the foregoing in view, the invention resides in the novel subject matter hereinafter described and claimed, the description being supplemented by the accompanying drawings.

Fig. 1 is a fragmentary perspective view of well known parts of an automobile, showing the relation of my invention therewith.

Fig. 2 is a vertical transverse sectional view as indicated by line 2—2 of Fig. 1.

In the drawing above briefly described, T designates a transmission housing containing the customary planetary gearing, and the usual pedals B, R and L are employed for controlling such gearing, the pedal L being the clutch or low speed pedal. Spaced outwardly from these pedals, a portion of one of the chassis bars C has been shown, and behind said pedals and to the left thereof, the usual hand-lever H has been illustrated. This lever operates in the usual way to move the pedal L to neutral position when said lever is pulled rearwardly to a certain extent, and upon further rearward movement of said lever, it applies the hub brakes in the usual way. This lever is provided with the pivoted pawl P engaging the rack r for the purpose of holding said lever in any position at which it is adjusted, and for releasing this pawl, the customary finger-piece F is provided at the upper end of the lever H, said finger-piece and pawl being connected by a rod F'.

A low-speed pedal actuator 3 is mounted for forward and rearward movement and is operatively connected with the pedal L, means are provided for connecting this actuator with the hand lever H to utilize rearward movement of this lever for the purpose of moving the actuator and thus shifting the pedal L into low, and hand-actuated means is provided on said hand lever for releasing said connecting means whenever desired. It will thus be seen that simply by pulling rearwardly upon the hand lever H to the required extent, the low speed pedal L will be moved into low speed position and then, the lever H being held by the pawl P and rack r, said pedal will also be held in low without further attention by the driver.

The actuator 3 is preferably in the form of a rod extending longitudinally of the chassis bar C, the rear end of said rod being preferably bent into the form of a loop as shown, or otherwise shaped to provide a shoulder 4 which faces forwardly. Cooperable with this shoulder, is a vertically movable dog 5 carried by the hand lever H, said dog being preferably pivoted to the lever as indicated at 6. For releasing the dog from the rod when desired, a rod 7 has been shown connected at its lower end with the dog and connected at its upper end with a second finger-piece 8 pivotally mounted on the upper end of the lever H.

A suitable guide 9 is provided to support the rear portion of the rod 3 in proper position. The front end of this rod is pivoted to a transverse lever 10 fulcrumed upon the chassis bar C, the inner end of this lever being connected by suitable linkage with the pedal L. Preferably, a block 11 is pivoted at 12 to the inner end of the lever 10 and is formed with an opening through which a link 13 passes, this link being pivoted at 14 to an appropriate clamp 15 secured around the pedal L. A nut 16 is threaded upon the front end of the link 13 and contacts with the block or the like 11. This nut may well be adjusted to compensate for wear upon the low speed band of the transmission and when it is properly set, rearward pulling of the lever H to a predetermined point, will effect movement of the low speed pedal L to its low speed position, and as said lever H is then held, the pedal will be similarly held.

For fulcruming the transverse lever 10, I have shown a vertical bolt 17 passing through one of the hangers h of the motor and through the upper flange of the chassis bar C. An appropriate washer 18 is provided on this bolt to contact with the lower side of the lever 10, a spacing sleeve 19 surrounds the bolt and rests upon this washer, said sleeve being received in an opening 20 in the lever 10, a brace 21 rests upon the upper end of the sleeve 19 and is formed with an opening receiving the bolt 17, and the nut 22 of said bolt tightly clamps said brace between the sleeve and nut, at the same time clamping said sleeve and the washer 18 tightly in place. Lever 10, however, due to the spacing sleeve 19, is left free to turn easily about its fulcrum.

In the present showing, the brace 21 extends forwardly from the bolt 17 and is provided with a vertically turned end 23 which is adapted to be secured to the dashboard of the machine. The shape of this brace, the shape of the lever 10, and that of the guide 9 may vary somewhat according to the model of the machine, upon which the invention is used. It will also be understood that the exact shaping of other parts of the invention may vary as occasion may dictate.

Ordinarily, that is when running in high gear, the pedal L is swung rearwardly beyond the position shown in Fig. 1 and consequently the outer end of the lever 10 and the rod 3 occupy a position further forward than shown in this view. Then too, the hand lever H is swung forwardly from the position shown in the drawing. When it is desired to throw the machine into low and hold it in this condition, the hand lever H may be pulled rearwardly, whereupon the dog 5 will engage the shoulder 4 and will rearwardly pull upon the rod 3. This rod effects swinging of the lever 10 about its fulcrum and causes pulling upon the pedal L to swing the latter to low speed position. When this position is reached, the pawl P and rack r hold the lever H and connected parts against return movement, so that the machine may be held in low for any desired length of time. Whenever necessary, by exerting slight forward pressure upon the pedal L with one foot, the driver may relieve the existing friction between the shoulder 4 and the dog 5, permitting use of the finger-piece 8 to retract said dog from engagement with the shoulder. Then, the pedal L may be allowed to move rearwardly into high, or the hand lever H may be swung further rearward to apply the hub brakes, as occasion may demand.

While the invention is simple and inexpensive, and may be easily applied and adjusted, it has proven to be highly efficient and very desirable. Excellent results have been obtained from the general construction shown and such construction is therefore preferably followed. However, within the scope of the invention as claimed, variations may, of course, be made.

I claim:—

1. In an automobile having a low speed pedal, a hand lever behind said pedal for moving the same to neutral and for applying hub brakes, and means for holding said lever in adjusted position; an actuator for said pedal operatively connected therewith and mounted for forward and rearward movement, means for connecting said actuator with said hand lever to utilize rearward movement of the latter for moving the pedal into low, and hand-actuated means on said hand lever for releasing said connecting means.

2. In an automobile having a low speed pedal, a hand lever behind said pedal for moving the same to neutral and for applying hub brakes, and means for holding said lever in adjusted position; an actuator for said pedal operatively connected therewith and mounted for forward and rearward movement, said actuator having a forwardly facing shoulder near said hand lever, a vertically movable dog mounted on said hand lever and engageable with said shoulder to connect the actuator and lever and cause rearward movement of the latter to move the aforesaid pedal into low, a pivoted finger-piece mounted on the upper end of said hand lever, and a connection between said finger-piece and said dog for releasing the latter when the former is moved.

3. In an automobile having a low speed pedal, a chassis bar spaced outwardly therefrom, a hand lever at one side of said chassis bar for moving the pedal to neutral and for applying hub brakes, and means for holding said hand lever in adjusted position; a transverse lever fulcrumed between its ends upon said chassis bar in advance of said pedal, linkage pivoted to and extending rearwardly from the inner end of said transverse lever and pivotally connected to said pedal, a pull rod pivoted to the outer end of said transverse lever and extending rearwardly along said chassis bar, the rear end of said rod having a forwardly facing shoulder, guiding means for said rod, a dog mounted for vertical movement on said hand lever and engageable with said shoulder, whereby upon rearward pulling of said hand lever, the rod, transverse lever and linkage will be actuated to move the aforesaid pedal into low, and hand-actuated means on said hand lever for releasing said dog from said shoulder.

In testimony whereof I have hereunto affixed my signature.

WILLIAM J. KIDD.